United States Patent
Hogstrom et al.

(10) Patent No.: US 8,397,111 B2
(45) Date of Patent: Mar. 12, 2013

(54) SOFTWARE MEMORY LEAK ANALYSIS USING MEMORY ISOLATION

(75) Inventors: Matt R. Hogstrom, Cary, NC (US); Robbie J. Minshall, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/977,779

(22) Filed: Dec. 23, 2010

(65) Prior Publication Data
US 2011/0093748 A1 Apr. 21, 2011

Related U.S. Application Data

(62) Division of application No. 11/753,899, filed on May 25, 2007, now Pat. No. 7,895,483.

(51) Int. Cl.
*G11C 29/00* (2006.01)

(52) U.S. Cl. ........................................ 714/718

(58) Field of Classification Search .................. 714/718, 714/799, 31, 25, 6.2, 42, 48, 54; 711/170, 711/124; 365/200, 201, 230.03
See application file for complete search history.

(56) References Cited

U.S. PATENT DOCUMENTS

| | | | |
|---|---|---|---|
| 3,909,800 A * | 9/1975 | Recks et al. ........................ 710/5 |
| 5,842,019 A | 11/1998 | Kolawa et al. |
| 6,035,426 A | 3/2000 | Applegate |
| 6,115,782 A | 9/2000 | Wolczko et al. |
| 6,370,684 B1 | 4/2002 | De Pauw et al. |
| 6,523,141 B1 | 2/2003 | Cantrill |
| 6,560,773 B1 | 5/2003 | Alexander, III et al. |
| 6,597,907 B1 | 7/2003 | Pruitt et al. |
| 6,629,266 B1 | 9/2003 | Harper et al. |
| 6,658,652 B1 | 12/2003 | Alexander, III et al. |
| 6,782,462 B2 | 8/2004 | Marion et al. |
| 6,892,378 B2 | 5/2005 | Curtis et al. |
| 7,035,884 B2 | 4/2006 | Garthwaite |
| 7,100,003 B2 | 8/2006 | Betancourt et al. |
| 7,234,080 B2 | 6/2007 | Cirne et al. |
| 7,266,727 B2 * | 9/2007 | Crowell et al. ................. 714/36 |
| 7,293,142 B1 | 11/2007 | Xu et al. |
| 7,398,369 B2 | 7/2008 | Dickenson |
| 7,478,281 B2 * | 1/2009 | Denniston ...................... 714/31 |
| 7,487,321 B2 | 2/2009 | Muthiah et al. |
| 8,176,365 B2 * | 5/2012 | Hishinuma et al. ............. 714/31 |
| 2003/0061597 A1 | 3/2003 | Curtis et al. |

(Continued)

FOREIGN PATENT DOCUMENTS

JP 20040053505 A 1/2004

OTHER PUBLICATIONS

Serrano, Manuel and Hans-J Boehm, "Understanding Memory Allocation of Scheme Programming," ACM SIGPLAN Notices, vol. 35, Issue 9, Sep. 2000.

(Continued)

*Primary Examiner* — Phung M Chung
(74) *Attorney, Agent, or Firm* — Arthur J. Samodovitz

(57) ABSTRACT

Detecting leaky memory during the execution of an application in a data processing system. A memory controller identifies a leaky section of memory and delegates to an allocation component to allocate more memory. An isolator component isolates the memory section and further divides the memory section into subsections. Each section and each subsection are tested to determine if memory resources are strained to identify an application or its component causing the strain. Each section and subsection are further divided and isolated until the leaky portion of memory is identified, and as a result, the software component causing the leak can also be identified.

6 Claims, 4 Drawing Sheets

U.S. PATENT DOCUMENTS

| | | | |
|---|---|---|---|
| 2004/0133895 | A1 | 7/2004 | Dahlstedt et al. |
| 2004/0172579 | A1 | 9/2004 | Fu |
| 2005/0114843 | A1 | 5/2005 | Gilgen et al. |
| 2005/0114844 | A1 | 5/2005 | Betancourt et al. |
| 2005/0204342 | A1 | 9/2005 | Broussard |
| 2005/0240747 | A1 | 10/2005 | Raut |
| 2006/0173877 | A1 | 8/2006 | Findeisen et al. |
| 2006/0213574 | A1 | 9/2006 | McKeever et al. |
| 2008/0155548 | A1 | 6/2008 | Dettinger et al. |
| 2008/0222450 | A1 | 9/2008 | Yang |
| 2010/0088558 | A1* | 4/2010 | Hishinuma et al. ........... 714/718 |

OTHER PUBLICATIONS

Hirzel, Martin Amer Diwan, and Antony Hosking, "On the Usefulness of Liveness for Garbage Collection and Leak Detection," Monday, Jan. 1, 2001, Springer Berlin / Heidelberg, vol. 2072/2001.

US Patent Office Action for U.S. Appl. No. 11/143,302 (US Patent 7496795), Feb. 5, 2008.

US Patent Office Notice of Allowability for U.S. Appl. No. 11/143,302 (US Patent 7496795), Oct. 10, 2008.

Murphy, "Flushing out memory leaks", Embedded Systems Programming, vol. 15, No. 3, pp. 37-41, Mar. 2002.

Serrano et al., "Understanding Memory Allocation of Scheme Programs," ICFP'00, Montreal, Canada, 2000, ACM 1-58113-202-6/00/0009, pp. 245-256.

Berger et al., "Reconsidering Custom Memory Allocation," OOPSLA '02, Nov. 4-8, 2002, Seattle, Washington, ACM 1-58113-417-1/02/0011, pp. 1-12.

Printezis et al., "GCspy: An Adaptable Heap Visualization Framework," OOPSLA '02, Nov. 4-8, 2002, Seattle, Washington, ACM 1-58113-417-1/02/0011, pp. 343-358.

Taylor, Art, "An Introduction to JEEE," informit.com, May 30, 2003, Prentice Hall PTR, pp. 1-11.

"IBM JVM Garbage Collection and Storage Allocation Techniques," IBM Developer Kit and Runtime Environment, JAVA 2 Technology Edition, Version 1.4.1., Service Refresh 1, Nov. 2003, pp. 15-18.

"Understanding the IBM JVM," JAVA 2 Technology Edition Version 1.4.2. Diagnostics Guide, IBM Corp., 2003, 2005, pp. 7-13 and pp. 19-23.

US Patent Office Action for U.S. Appl. No. 11/753,899 (US Patent 7895483), Feb. 4, 2010.

US Patent Office Action for U.S. Appl. No. 11/753,899 (US Patent 7895483), Jul. 28, 2010.

US Patent Office Notice of Allowability for U.S. Appl. No. 11/753,899, Oct. 19, 2010.

* cited by examiner

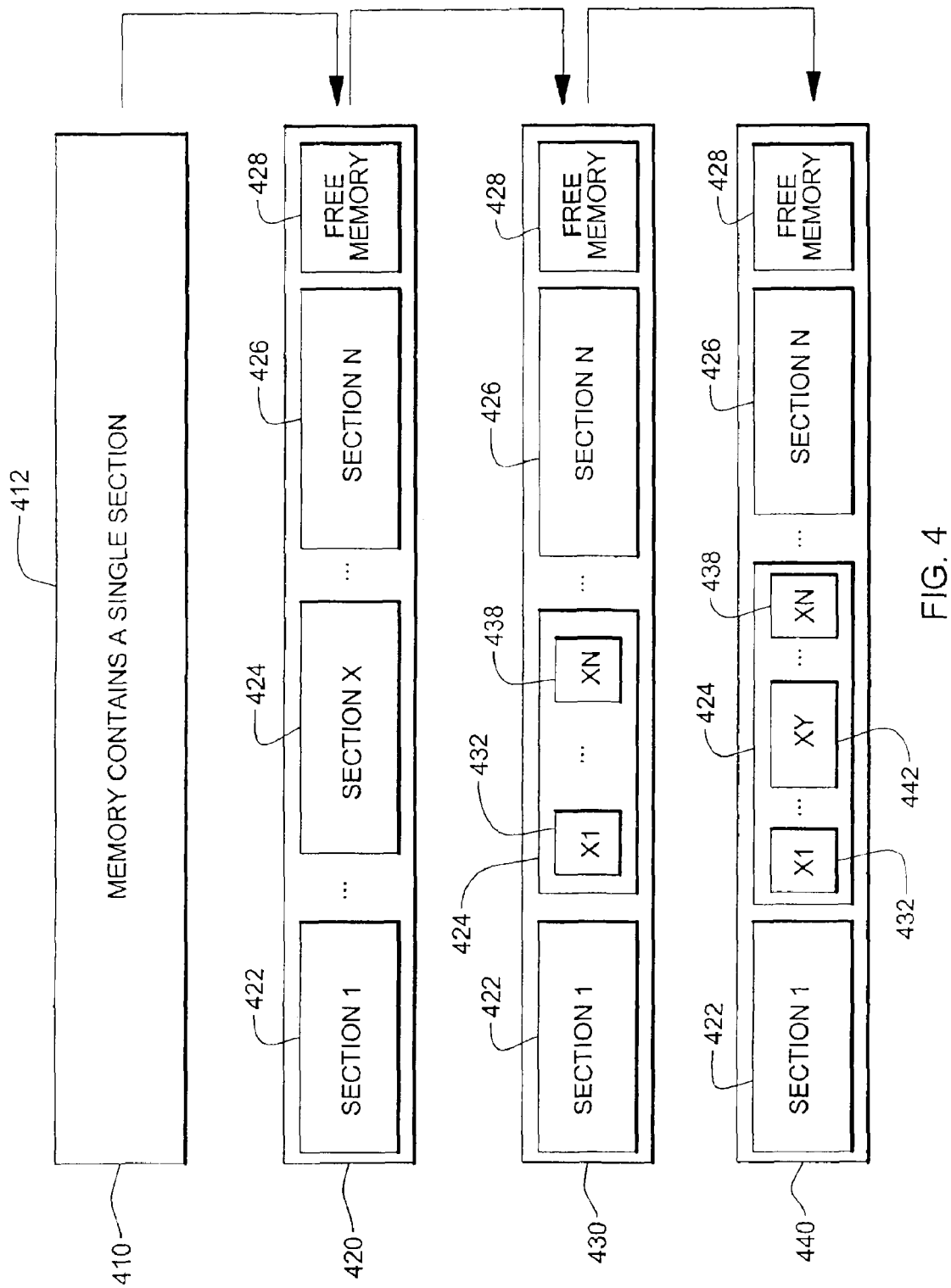

SOFTWARE MEMORY LEAK ANALYSIS USING MEMORY ISOLATION

CROSS-REFERENCE TO RELATED APPLICATIONS

This application is a divisional under 35 U.S.C. §120 of US patent application Ser. No. 11/753,899 entitled SOFTWARE MEMORY LEAK ANALYSIS USING MEMORY ISOLATION filed on 25 May 2007, which application is hereby incorporated by reference in its entirety. This application is further related to the U.S. Pat. No. 7,496,795, application Ser. No. 11/143,032 entitled METHOD, SYSTEM, AND COMPUTER PROGRAM PRODUCT FOR LIGHT WEIGHT MEMORY LEAK DETECTION filed 2 Jun. 2005, which application has the same assignee and is incorporated by reference in its entirety.

BACKGROUND

Field of the Invention

This invention relates to the field of computer software and more particularly relates to a method, a computer program product, and a service for analyzing software causing abnormal memory consumption by recursively isolating memory sections and then identifying the software component causing the abnormal memory usage.

A computer's operating system automatically allocates sections of random access memory (RAM) during execution of applications and programs. For programs written in the programming language C, there are three kinds of storage classes. The default storage class is called automatic or local which means that when a variable is declared in a function block without any special storage class designation, it is allocated to a memory location only so long as the function is called. After the function terminates, the variable no longer occupies memory. Other memory allocations are called the "heap" and the "stack." Static variables are allocated memory in the heap and are not deleted until the program is ended. When a variable is declared as static, it is an internal static variable within a function block. Although the function code and its automatic variables disappear when the function terminates, the static variables retain their memory. Thus the value that a static variable has at the beginning of the next execution of the function is the same value that the static variable had from the pervious termination of the function. Local variables or variables that are declared inside a block, including the block that defines a method, are dynamically allocated from the system stack; they are deleted when the block in which they are declared is terminated. The portion of a program which references a local variable is the variable's scope and that portion comes into scope when its declaration is executed and goes out of scope when the block is terminated. Lifetime is the time in which memory is allocated for the variable. As the application executes, sections or blocks of memory are used and then freed by a process called garbage collection so that the memory becomes a random mix of used and free memory blocks throughout.

Fragmentation of memory results when small patches of free memory become unusable. The operating system or the application requests more memory than what is available in the small patches, for instance, the application may request thirty bytes of contiguous memory but there may be only small patches of ten or twenty bytes available. In a long-running program, this fragmentation can cause an application to run out of memory even though the total amount of memory allocated does not exceed the total available memory. Memory fragmentation can be managed, however, by specific allocation and management of the memory heap.

Memory leaks, however, are very different than fragmentation. A leak occurs when an application requests and allocates a block of memory but that memory will never be freed because of an error or bug in the application. For instance, pointers to that block of memory may go out of scope or may be assigned to point somewhere else so the application is never able to release that block of memory. Another example is when an application allocates an object to a block of memory and because an improper reference was set, the application forgets to properly "de-reference" the object. This leaves the object in a referenced but forgotten state and because it will never be properly "de-referenced," the garbage collector cannot reclaim block of memory.

A common problem with some applications is the inability to manage memory usage. There are applications that will take system memory and never give it back for other applications to reuse. When the application does not return the memory and no longer requires the memory, it is called a "memory leak". The result is that performance on the host machine will degrade and eventually the application causing the memory leak will fail. One standard operating procedure may include rebooting the server once a week to compensate for the memory consumption but if the memory leak occurs too quickly, the server may need to be rebooted before the scheduled maintenance window. Another technique employed is a combination of progressive thresholds with an event sequence rule to detect for abnormal memory behavior. Monitoring is set to create events as the memory usage passes threshold points of, say, 50 percent, 75 percent and 90 percent. If those threshold points are reached within a critical time, e.g., less than a day or a week, an alarm is generated to provide notification to reboot the server prior to the scheduled maintenance window and hopefully prior to failure of the application or the system.

FIG. 1 is a graphical representation of a memory leak. The x-axis represents time in processing cycles, e.g., gigacycles, and the y-axis represents that size of memory in megabytes. The solid line represents the amount of free memory that is available to an application(s) while the dashed line represents the amount of memory allocated to a particular application. The free memory curve has been smoothed in FIG. 1 for illustrative purposes; typically the curve has periodic fluctuations. Note that after a certain time, e.g., 500 gigacycles, the memory size has reached its maximum and the available memory diminishes until there is no available memory. In the graph of FIG. 1 the memory leak is apparent to the eye but in general, a user would not be aware of the memory leak until after the server crashed unless the user was actively monitoring the consumption of memory.

Memory leaks or memory misuse always cause poor performance and may cause process failures. When the application is a short-term program, the memory leak disappears as soon as the application is closed. In a long-running embedded application like a JAVA 2 PLATFORM, ENTERPRISE EDITION (J2EE) application server, however, the memory leak continues to grow until performance is compromised and the application and system finally seizes up and crashes. Misbehavior in an ongoing executing application is often difficult to find because the problem may occur far away in time and space from when and where the problematic code executed. For instance, some memory leaks may not be detected until after the application has passed all system tests and put into production but then the system crashes for unknown reasons. In critical applications, it is simply not acceptable for an application or a system to crash; nor is it always possible to terminate the application to find the memory leak because it is may be used in ongoing production systems such as life-sustaining applications or continuous financial applications or others.

At this time, memory leaks or memory misuse are common within JAVA applications including J2EE runtime. Upon initialization of a JAVA VIRTUAL MACHINE (JVM), the operating system allocates a contiguous area of RAM memory storage wherein the start of the heap is the heapbase and the end of the heap is the heaptop. The heaplimit is the top of the currently-used part of the heap and it can expand and shrink. There are control options that control the size from heapbase to heaptop and the initial size from heapbase to heaplimit. If not specified, the JVM issues system defaults depending upon the operating system and for most applications, the default settings work well. The heap expands until it reaches a steady state which, in the best of circumstances, gives a heap occupancy of 70 percent, i.e., the amount of live data on the heap at any given time is approximately 70 percent. At this level, the frequency and pause time of garbage collection should be at an acceptable level. For some applications, however, the default settings do not yield the best performance because of one or more of the following reasons: (i) the frequency of garbage collections is too high until the heap reaches a steady state; (ii) the heap is fully expanded and the occupancy level is greater than 70 percent; (iii) at 70 percent occupancy, the frequency of garbage collection is too high; (iv) pause times are too long, etc.

In a virtual machine or other application, a storage component allocates sections of memory that define objects, arrays, and classes in memory, such as the memory heap. When a section of memory has been allocated, an object continues to be live while a reference (pointer) to it exists somewhere in the active state of the application, such as a virtual machine; thus the object is reachable. When an object ceases to be referenced from the active state, it becomes garbage and can be reclaimed or freed for reuse. The JVM allocates different amounts of memory for different calls to different allocation interfaces having their own respective parameters and semantics, e.g., a cache, an object, an array, or a class. The routine to allocate memory for a cache is specifically designed to deliver optimal allocation performance for small objects; previously-called objects are allocated directly from a thread local allocation buffer; new objects are allocated from the end of a cache without the need to grab the heap lock. Objects and arrays are allocated from memory and if small enough, on the order of currently 512 bytes, may be allocated from the cache.

Analyzing memory leaks that occur in production systems is very expensive. Tools do exist for memory leak analysis but these tools are not appropriate for production runtime analysis. Typically, current analysis of memory leaks insert byte code into common garbage collections. Another technique is to add debug code to the production software but adding debug code usually alters the behavior of the application and changes the shape of the memory layout, making the bug causing the memory leak harder to detect. Debug code, moreover, consumes memory so the application undergoing debugging may actually run out of RAM sooner than the production version. Also, adding debugging code after a failure has occurred means that other failures will occur as the program is being debugged and that the data surrounding the initial failure is lost.

Another current method of analysis of memory leaks is to attach an instrumentation agent such as the JAVA VIRTUAL MACHINE PROFILING INTERFACE (JVMPI). JVMPI is an application program interface (API) between the JVM and an in-process profiler agent. The virtual machine notifies the profiler agent of various events corresponding to memory heap allocation, method calls, etc. The profiler agent can enable or disable notification of events, and issue control requests through the JVMPI, e.g., the profiler agent may decide to intercept execution of the leaking program to transmit information to a software developer about the JVM and the application causing the memory leak. The JVMPI then can control the JVM; for instance, a profiling agent is allowed to force a garbage collection cycle. One disadvantage, however, with using a JVMPI is that it may invoke a server restart—an unacceptable choice for production systems. The JVMPI, moreover, is still an experimental interface and will most likely be replaced with a newer interface, thus requiring still newer tools not yet created to deal with the problems.

Another method of analyzing memory leaks involves analysis of heap dumps offline but this solution presumes early identification of the problem and requires acquisition of a problem determination machine. In addition, a dump of all memory and the objects within memory does not necessarily transfer contextual information about the allocations. As such, a significant degree of the server memory and resources are generally required to troubleshoot problems using this technique. In addition, a memory dump does not necessarily transfer contextual information about the memory allocation. In general and as is known by one of skill in the art, the generation and transfer of large memory heap dumps cripples the server.

Thus, there is not a good solution for the analysis of memory leaks during ongoing execution of a production server. Reproduction of memory leaks found in production systems on test machines is difficult, time consuming, expensive and often not possible. These shortcomings are solved by the method, service, and the computer program product set forth below:

SUMMARY

Disclosed herein is a method, a service, and a computer program product of finding a source of an abnormal memory condition, such as a memory leak, in a data processing system; the method, the service and the computer program product has components that recursively divide a memory section experiencing the abnormal memory condition into a plurality of smaller logical memory sections; and then recursively tests each of the one or more of the smaller logical memory sections until the source of the abnormal memory condition is found. Additional memory may be allocated by the method, the service, and the computer program product to the smaller logical memory section experiencing the abnormal memory condition. Otherwise, the memory sections or subsections experiencing the abnormal memory condition may be isolated and a logical component of an application or a virtual machine using that memory section may be identified. The method, the service, and the computer program product may issue a warning that the smaller logical memory section is experiencing an abnormal memory condition and the logical component is associated with the abnormal memory condition; or it could bind the logical component to the smaller logical memory section experiencing the abnormal memory condition; or it could take the logical component out-of-service.

The data processing system may be located remotely from and connected to the memory experiencing the abnormal memory condition over a network, such as the Internet, a WAN, a LAN, etc. Similarly, the service may be administered from, and the computer program product may be stored and executing, and the method may be executing on a computer system located over a network from both the data processing system and/or the memory experiencing the abnormal memory condition.

The method, the service, and the computer program product identifies the software components of an application or a virtual machine that is causing the abnormal memory condition and the isolation and allocation of memory can be put into a contextual relationship with the application or component of that application that allocated those objects.

BRIEF DESCRIPTION OF THE FIGURES

FIG. 4 is a graphical representation of steps by which memory can be allocated and a memory leak can be isolated by the memory leak controller.

DETAILED DESCRIPTION OF THE INVENTION

Figure 1:
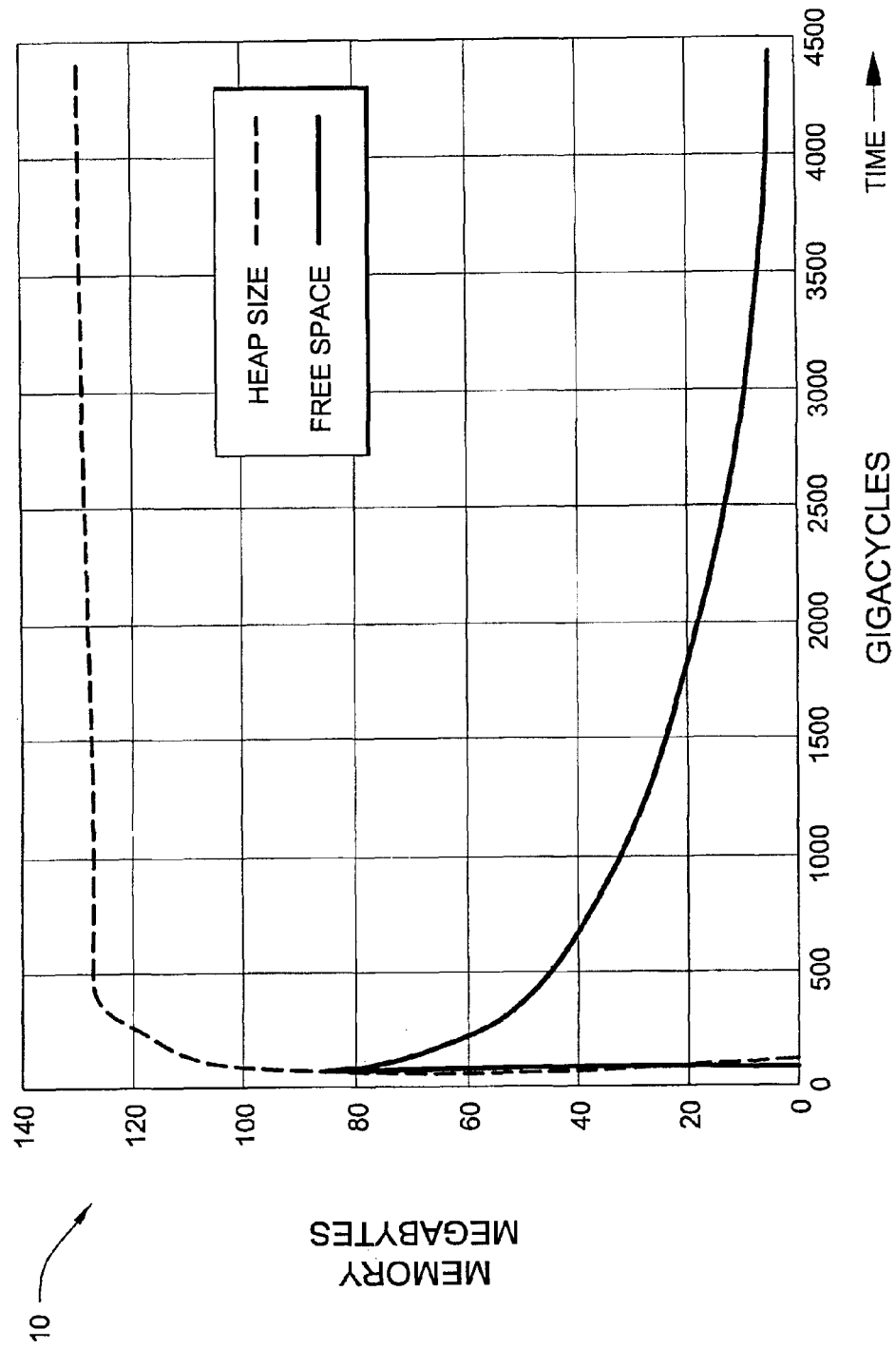
FIG. 1 is a graph of time versus memory size showing the relationship between free memory and the memory heap size when a memory leak occurs.

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like elements throughout.

As will be appreciated by one of skill in the art, the present invention may be embodied as a method, a data processing system, a computer program product and a service to detect a memory leak, isolate memory experiencing the memory leak and reallocate memory so that the programs and/or computing system don't fail. Accordingly, the present invention may take the form of an entirely hardware embodiment, an entirely software embodiment, or an embodiment combining software and hardware aspects. Furthermore, the present invention may take the form of a computer program product on a computer-usable storage medium having computer-usable program components embodied in the medium. Any suitable computer readable medium may be utilized including hard disks, CD-ROMs, optical storage devices, a transmission media such as those supported by the Internet or an intranet, or magnetic storage devices.

Computer program source code of the memory leak controller in accordance with a preferred mode described herein may be written in any programming language such as C, JAVA, SMALLTALK or C++. It is successfully implemented as part of a JAVA VIRTUAL MACHINE (JVM). Object code of the memory leak controller may execute entirely on an individual computer, partly on an individual or a backup computer, as a stand-alone software package, partly on the individual or backup computer and partly on a remote computer or entirely on the remote computer. In the latter scenario, the remote computer may be connected to the individual or backup computer through a local area network (LAN) or a wide area network (WAN), or the connection may be made to the remote computer via the Internet using an Internet Service Provider.

The memory leak controller is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided as components to a processor of a general purpose computer, special purpose computer, or other programmable data processing apparatus to produce a machine, such that the components, which execute via the processor of the computer or other programmable data processing apparatus, create means for implementing the functions/acts specified in the flowchart and/or block diagram block or blocks.

These computer program components for the memory leak controller may also be stored in a computer-readable memory that can direct a computer or other programmable data processing apparatus to function in a particular manner, such that the components stored in the computer-readable memory produce an article of manufacture including components which implement the function/act specified in the flowchart and/or block diagram block or blocks. The computer program components may be loaded onto a computer or other programmable data processing apparatus to cause a series of operational steps to be performed on the computer or other programmable apparatus to produce a computer implemented process such that the components which execute on the computer or other programmable apparatus provide steps for implementing the functions/acts specified in the flowchart and/or block diagram block or blocks.

Figure 2:
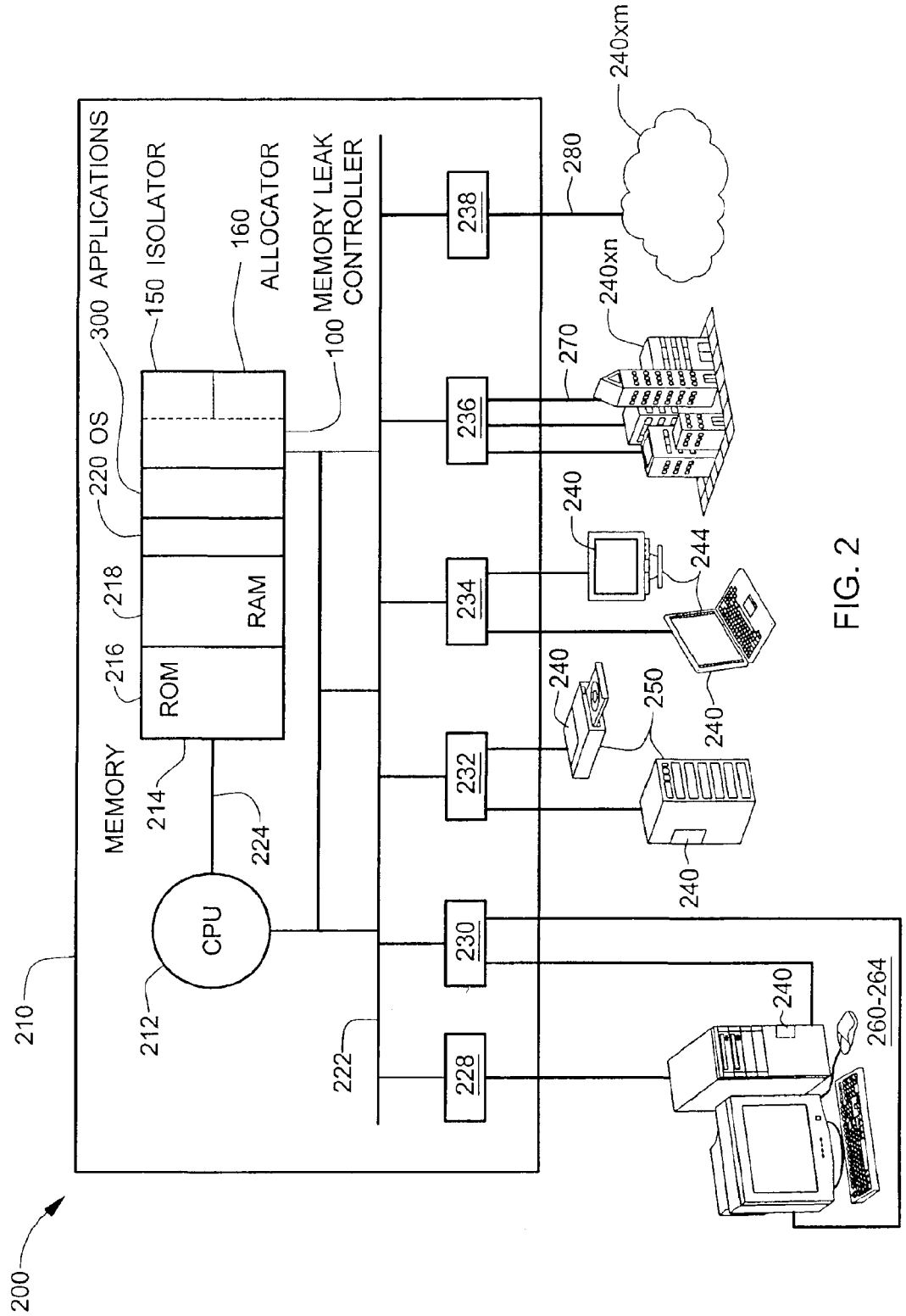
FIG. 2 is a simplified block diagram of a data processing network and machine having the memory leak controller in accordance with embodiments of the invention.

Referring to FIG. 2, a high-level block diagram of a computer network system 200 consistent with an embodiment of the memory leak controller 100 is shown. Computer network system 200 preferably comprises a number of secure networked computers 210, each of which may have a central processing unit (CPU) 212, memory 214, and various digital and/or analog interfaces 228-238. The various devices communicate with each other via an internal communications bus 222. CPU 212 is a general-purpose programmable processor, executing instructions stored in memory 214; while a single CPU 212 is shown in FIG. 2, it should be understood that computer systems having multiple CPUs could be used. CPU 212 is capable of executing an operating system 220 and the memory leak controller 100 and other applications 300. CPU 212 is also capable of generating the computer program components embodying the memory leak controller 100 and is capable of receiving and transmitting the components have program instructions embodying the memory leak controller 100. Communications bus 222 supports transfer of data, commands and other information between different devices, and while shown in simplified form as a single bus, it is typically structured as multiple buses including an internal bus 224 which may connect the CPU 212 directly with memory 214.

Memory 214 comprises a read only memory (ROM) 216 and a random-access memory (RAM) 128 for storing the operating system 220, the memory leak controller 100, and other applications 300, data and programs. Typically, those portions or programs, routines, modules of the operating system 220 necessary to "boot up" are stored in ROM 216. RAM 218 typically stores programs and data that will be erased when the computer turns off. Memory 214, 240 is shown conceptually as a single monolithic entity but it is well known that memory is often arranged in a hierarchy of caches and other memory devices, some or all of which may be integrated into the same semiconductor substrate as the CPU 212. RAM 218 devices comprise the main storage of computer, as well as any supplemental levels of memory, e.g., cache memories, nonvolatile or backup memories, programmable or flash memories, other read-only memories, etc. In addition, memory 214, 240 may be considered to include memory storage physically located elsewhere in computer, e.g., a cache memory in a processor or other storage capacity used as a virtual memory, e.g., as stored on a mass storage device 250 or on another computer coupled to computer via network. It is fully realizable that the memory leak controller 100 can be used to detect memory leakage of any dynamic memory 214, 240 including ROM and RAM located within and outside the computer processing device 210 upon which the memory leak controller 100 is installed and executing. As shown in FIG. 2, memory leak controller 100 may be connected to memories 240 installed on other devices across the network and may isolate and allocate memory 240 in accordance with the principles herein.

Operating system 220 and the memory leak controller 100 and other applications 300 reside in memory 214. Operating system 220 provides, inter alia, functions such as device interfaces, management of memory pages, management of multiple tasks, etc. as is known in the art. Examples of such operating systems may include LINUX, AIX, UNIX, Windows-based, Z/OS, V/OS, OS/400, an RTOS, a handheld operating system, etc. These operating systems 220 and other various components of the memory leak controller 100 and other applications 300, other components, programs, objects, modules, etc. may also execute on one or more processors in another computer coupled to computer 210 via a network 270, 280, e.g., in a distributed or client-server computing environment, whereby the processing required to implement the functions of a computer program may be allocated to multiple computers 210 over a network 270, 280.

In general, the memory leak controller 100 executes within the CPU 212 to implement the embodiments of the invention, whether implemented as part of an operating system or a specific application, component, program, object, module or sequence of instructions may be referred to herein as computer programs or simply components. The memory leak controller 100 typically comprises one or more instructions that are resident at various times in various memory 214, 240 and storage in a device and that, when read and executed by one or more processors in the processing device 210, cause that device 210 to perform the steps necessary to execute steps or elements embodying the various aspects of the invention. The memory leak controller 100 comprises a memory isolator component 150 that isolates the memory block identified as experiencing the leak. The memory leak controller 100 further comprises a memory allocation component 160 that allocates or redistributes memory in accordance with the features described herein.

It should be appreciated that computer 210 typically includes suitable analog and/or digital interfaces 228-238 between CPU 212 and the attached devices as is known in the art. For instance, computer 210 typically receives a number of inputs and outputs for communicating information externally. For interface with a software developer or operator, computer 210 typically includes one or more software developer input devices 260-264, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 210, e.g., some server implementations, might not support direct software developer input and output. Terminal interface 234 may support the attachment of single or multiple terminals 244 and may be implemented as one or multiple electronic circuit cards or other units. Data storage 250 preferably comprises one or more rotating magnetic hard disk drive units, although other types of data storage, including a tape or optical driver, could be used. For additional storage, computer 210 may also include memory 240 comprising one or more mass storage devices 250, e.g., a floppy or other removable disk drive, a hard disk drive, a direct access storage device (DASD), an optical drive e.g., a compact disk (CD) drive, a digital video disk (DVD) drive, etc., and/or a tape drive, among others. Memory 214, 240 or a portion of which may be isolated and reallocated by the memory leak controller 100 may be located on RAMs and/or mass storage devices of different computers 210 that are located through the Internet 280, a WAN 270, and other connected machines 228. One of skill in the art will further anticipate that the interfaces 228-238 may also be wireless.

Furthermore, computer 210 may include an interface 236, 238 with one or more networks 270, 280 to permit the communication of information with other processing devices and memory 240 coupled to the network(s) 270, 280. Network interface(s) 236, 238 provides a physical and/or wireless connection for transmission of data to and from a network(s) 270, 280. Network(s) 270, 280 may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that computer system 200 may be connected to more than one network 270, 280 simultaneously. Computer system and remote systems 228 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network(s) 270, 280. Still yet, any of the components of the methods and program products shown in the embodiments of FIG. 2 through FIG. 4 could be deployed, managed, serviced by a service provider who offers to perform one or more of: isolating a memory leak using the memory isolation component 150, allocating memory using the memory allocation component 160 or other components or process steps of the memory leak controller 100.

In the context herein memory 214, 240 may also be considered nonvolatile or backup memories or a programmable or flash memories, read-only memories, etc., in a device physically located on a different computer, client, server, or other hardware memory device, such as a mass storage device or on another computer coupled to computer via network. Memory 214, 240 preferably comprises remote archival memory such as one or more rotating magnetic hard disk drive units, a tape or optical driver. Memory 214, 240 may also be considered one or more mass storage devices, such as a floppy or other removable disk drive, a hard disk drive, a direct access storage device (DASD), an optical drive e.g., a compact disk (CD) drive, a digital video disk (DVD) drive, etc., and/or a tape drive, among others.

Figure 3:
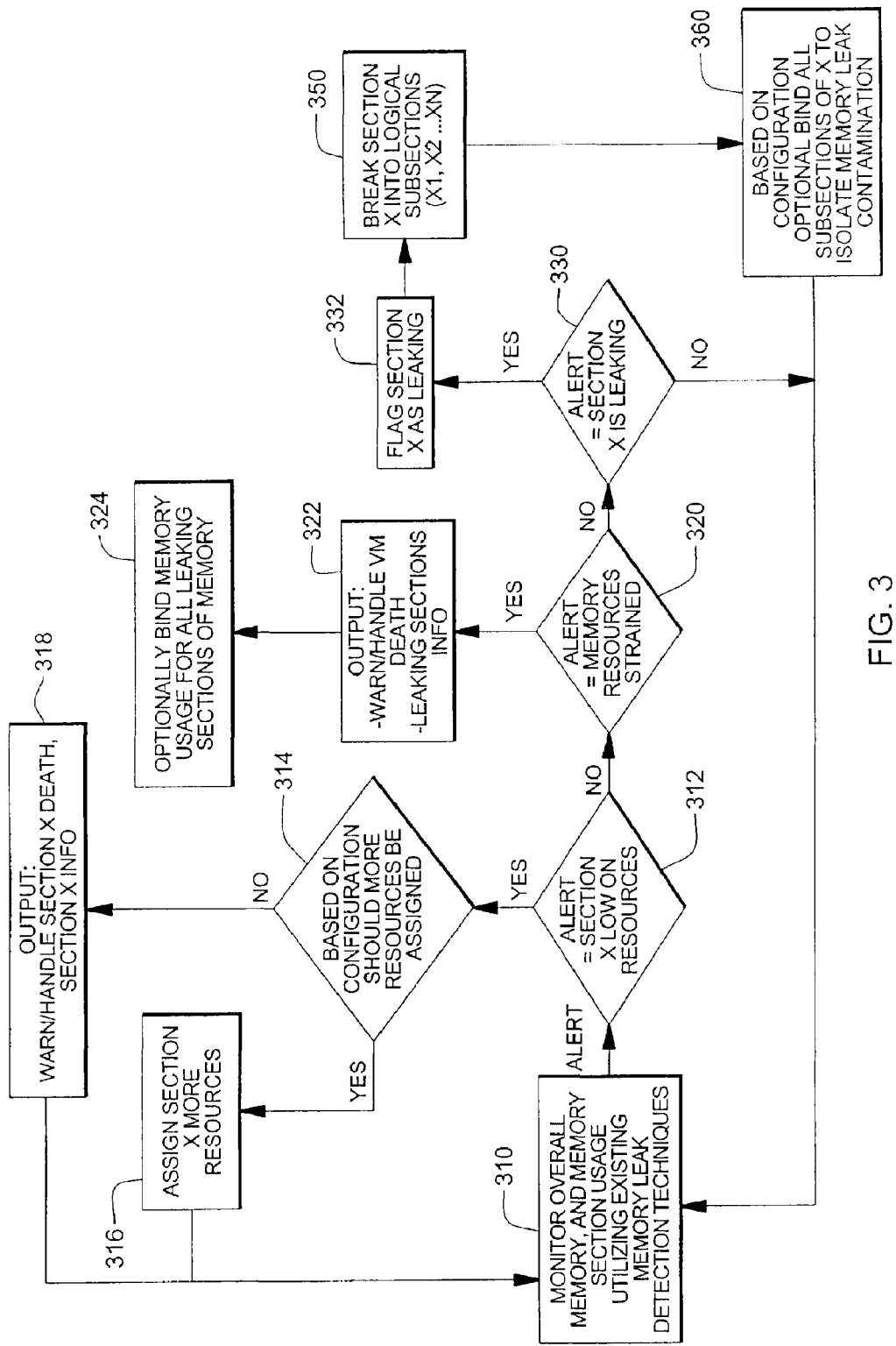
FIG. 3 is a simplified flow chart of the process by which a memory leak is detected and isolated in accordance with an embodiment of the memory leak controller. It is suggested that FIG. 3 be printed on the face of the patent.

It is useful to view FIGS. 3 and 4 together. With respect to FIG. 3, a simplified flow chart of process steps of the method and the service of the memory leak controller 100 is shown; with respect to FIG. 4, another view or perspective of the processes performed by the isolation and allocation components 150, 160 of the memory leak controller 100 are presented. At block 410 of FIG. 4, an application such as a virtual machine may be allocated a single section of memory 412. The memory leak controller 100 determines the allocation of memory to the application but then delegates the actual task of allocating memory to the memory allocation component 160. Memory may be initially allocated according to application components, such as standard J2EE components, the services or other logical components. Memory may also be partitioned or sectioned to optimize memory usage based on application size, priority, and logical components of the application. Applications typically have logical components and the breakdown of these logical components is usually dependent upon the technology, e.g., J2EE applications have the logical components of jars and wars, which may have further smaller logical components of servlets, and enterprise JAVA beans (EJBS). Block 420 of FIG. 4 represents memory 412 divided into sections of memory, labeled 422, 424, 426 and free memory 428. One of skill in the art will realize that the sections of memory 422, 424, 426 may or may not be adjacent or contiguous in the actual memory. In fact, free memory 428 may be interspersed between the sections 422, 424, 426 of memory.

The method and service to allocate and isolate memory as described herein can be undertaken after memory leak detection; alternatively the memory leak controller 100 can be used as a joint memory detection and analysis mechanism. Preferably, as in step 310 of FIG. 3, the memory monitoring process uses techniques known in the art that detect low memory or memory leak conditions within the memory and subsections of the heap, examples of which include U.S. patent application Ser. No. 11/143,032 entitled METHOD, SYSTEM, AND COMPUTER PROGRAM PRODUCT FOR LIGHT WEIGHT MEMORY LEAK DETECTION filed 02 Jun. 2005 and/or WEB SPHERE APPLICATION SERVER ADVISOR LIGHT WEIGHT MEMORY LEAK DETECTION that monitor freely available memory statistics and perform basic trend analysis as well as threshold checks. The memory leak controller 100 is also lightweight meaning that the analysis minimally affects the performance of the application and does not require verbose garbage collection or a JVMPI. In a preferred embodiment, the memory controller 100 and its components 150, 160 and other components, because of the lightweight feature, are used to monitor memory usage of a production data processing system or a data processing system that provides services requiring continuous data processing, such as internet services, financial transactions, life-sustaining processes, i.e., to shut-down and/or reboot the data processing system imposes an extreme hardship on the companies or the people relying on that data processing system.

In step 310, the memory leak controller 100, often upon garbage collection, identifies a section of memory experiencing abnormal memory usage and in response generates an alert. Each memory section 422, 424, 426 allocated to that application is recursively tested as in blocks 312, 320, and 330. First, a memory section is tested to determine if there are dangerous low memory conditions for that section as in step 312. For instance, memory trends may indicate that the threshold of free memory in relation to the total memory assigned to a memory section has been exceeded and additional memory resources, e.g., memory, pointers, caches, etc., will be required. So then in step 314, the memory controller 100 considers the current and desired configuration of the total available memory, the application priority, the presence or absence of a memory leak, etc., and then, if more memory resources are to be allocated, communicates with the memory allocation component 160 to allocate more memory in step 316. The process then recursively monitors memory as in step 310.

If, however, in step 314, more resources should not be assigned to the section X, then the memory isolator component 150 of the memory controller 100 isolates the section of memory as in step 318. The memory controller 100 may then issue the warning that section X is low of memory and may soon become unavailable, may run out of memory, or be slow to respond, and that action is required, as in step 318. Perhaps the memory controller 100 may determine that an appropriate action would be to take the logical component associated with the memory section off-line. If the application is a J2EE application, the memory controller 100 may take particular logical components, i.e., jars, wars, servlets, EJBS, of that application out-of-service.

If, in step 312, the alert does not indicate that a memory section is low on resources, then in step 320, the alert may indicate that the memory resources are strained meaning that, for example, there may be very little free memory left in the entire memory or there may be one or more memory leaks within one or more sections of memory, or that an application has requirements for large contiguous sections of memory that are not available, etc. If so, then in step 322, the memory leak controller 100 provides a warning that the memory resources are dangerously low and that the virtual machine or other applications may soon die. The memory leak controller 100 may also provide information or error reports on the leaking sections.

Optionally, in step 324, the memory isolator component 150 of the memory leak controller 100 may bind an application or a component of an application to a specific and limited section of leaky memory meaning that the extent of that component's memory usage is limited to that subsection of memory and that subsection of memory cannot be used by other applications or components. The memory leak isolator component 150, when it identifies and binds a component's memory allocation, automatically limits the performance reduction and quality of service problems to the logical component. Because the offending code can be identified and isolated, this step of binding and isolating the leaky section of memory assists with debugging and fault isolation. In other words, the memory controller 100 identifies a leaky section of memory whose leak may be caused by a logical component of an application. Identifying and isolating the memory section is, in essence, equivalent to isolating the component but the identified logical component may be shared with other components of an application. What is important in the context of the activities of the memory controller 100 is that the logical component of the application causing the leak is isolated to a subsection of memory and the size of that subsection of memory may be bound. The memory allocation component 160 of the memory leak controller 100 may further reallocate memory to another memory subsection or to the same area utilizing free space based upon the demands of that and other cooperating components.

If, in step 320, the memory resources are not strained, the alert may instead indicate that a section X of memory may be leaking, as in step 330. If the section X of memory is not leaking in step 330 the process returns back to step 310 to monitor memory usage. If, in step 330, memory section X is leaking, e.g., memory usage of that section is continuously and consistently increasing, then the memory leak controller 100 flags the memory section X in step 332. Then the memory isolator component 150 of the memory leak controller 100 further divides memory section X into a number of logic subsections, as in step 350. Viewing FIG. 4, the memory controller has detected a leak in memory section 424 of the memory 412. The memory controller 100 then delegates to the memory isolator component 150 to divide the problematic memory section into multiple smaller subsections 432 . . . 438, represented in block 430 of FIG. 4. In block 430, the executing application or virtual machine is further broken down into its logical components, by, e.g., package names, and the offending component of the application or virtual machine may be identified and taken out-of-service. The memory isolator component 150 further isolates subsections of memory sections 432 . . . 438 to each of their respective logical subcomponents, shown in block 440. The memory leak controller 100 has further detected, in block 440, the subsection XY 442 has run out of allocated memory space, and memory monitoring issues an alert. Memory allocation component 160 may allocate free memory 428 to subsection XY 442.

If the subsections of the memory 432 . . . . 438 cannot be recursively broken down and into smaller logical sections and tested as above, or if a subsection does not qualify for more free memory or if the entire memory itself is running out of memory, an alert is output identifying the leaky subsections indicating that the subsection may soon exhaust the allocated memory. These alerts are sent out so that action can be taken. In step 360 of FIG. 3, the memory isolator component 150 of the memory leak controller 100 may optionally bind all subsections of section X to isolate memory leak contamination or perform the other tasks, such as to take the subcomponents associated with the leaky memory subsections out-of-service. The process then recursively monitors memory usage, as in step 310.

These procedures, as in steps 318 to 310 or steps 360 to 310 or steps 330 to 310, can be recursively and continuously performed on sections, subsections, sub-subsections which are tested until the leaking container class is identified and can be presented to the user. Advantages realized by the memory leak controller 100 include analysis of the memory usage to be performed in production systems without the attachment of agents, byte code insertion or the expensive use of memory dumps. Because of this, the memory leak controller 100 protects and maintains the performance of other applications or components on the same system, and allows analysis of a memory leak while the problem is ongoing in production systems and exists and eliminates the problem of reproduction in test environments.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A computer system for identifying a source of memory leak in a data processing system, the system comprising:
   a central processing unit;
   a computer readable memory and a computer readable storage device;
   program instructions, stored on the computer readable storage device for execution by the central processing unit via the computer readable memory, to identify a section of memory experiencing abnormal memory usage;
   program instructions, stored on the computer readable storage device for execution by the central processing unit via the computer readable memory, to identify a section of memory experiencing strained memory resources;
   program instructions, stored on the computer readable storage device for execution by the central processing unit via the computer readable memory, to identify a section of memory no longer required by an application in the system but not available for one or more other applications in the system.

2. The computer system of claim 1, further comprising:
   program instructions, stored on the computer readable storage device for execution by the central processing unit via the computer readable memory, to monitor availability of the identified strained section of memory; and
   program instructions, stored on the computer readable storage device for execution by the central processing unit via the computer readable memory, to allocate additional memory resources to the identified strained section of memory in response to the identified strained section of memory having a critically low memory condition.

3. The computer system of claim 1, further comprising:
   program instructions, stored on the computer readable storage device for execution by the central processing unit via the computer readable memory, to logically divide the identified section of memory experiencing abnormal memory usage into a plurality of smaller subsections; and
   program instructions, stored on the computer readable storage device for execution by the central processing unit via the computer readable memory, to test the plurality of smaller subsections to identify one or more of the plurality of smaller subsections experiencing an abnormal memory usage.

4. The computer system of claim 3, further comprising:
   program instructions, stored on the computer readable storage device for execution by the central processing unit via the computer readable memory, to determine a program component to which the identified smaller subsection of memory has been allocated.

5. The computer system of computer 4, further comprising:
   program instructions, stored on the computer readable storage device for execution by the central processing unit via the computer readable memory, to isolate usage of the identified smaller subsection of memory to the program component.

6. The computer system of claim 1, further comprising:
   program instructions, stored on the computer readable storage device for execution by the central processing unit via the computer readable memory, to recursively test a plurality of smaller subsections of the identified section of memory experiencing abnormal memory usage to identify one or more of the plurality of smaller subsections as experiencing abnormal memory usage.

* * * * *